(12) United States Patent
Liingaard et al.

(10) Patent No.: US 8,779,619 B2
(45) Date of Patent: Jul. 15, 2014

(54) WIND POWER INSTALLATION AND METHODS OF USING A MACHINE FRAME IN A WIND POWER INSTALLATION

(75) Inventors: Anders Haslund Liingaard, Hinnerup (DK); Erik Markussen, Videbæk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 41 days.

(21) Appl. No.: 13/504,649

(22) PCT Filed: Oct. 28, 2010

(86) PCT No.: PCT/EP2010/066317
§ 371 (c)(1),
(2), (4) Date: Apr. 27, 2012

(87) PCT Pub. No.: WO2011/051369
PCT Pub. Date: May 5, 2011

(65) Prior Publication Data
US 2012/0205915 A1 Aug. 16, 2012

Related U.S. Application Data

(60) Provisional application No. 61/255,684, filed on Oct. 28, 2009.

(30) Foreign Application Priority Data

Oct. 28, 2009 (DK) ................................ 2009 70176

(51) Int. Cl.
*F03D 9/00* (2006.01)
*H02P 9/04* (2006.01)

(52) U.S. Cl.
USPC ............................................. 290/55; 290/44

(58) Field of Classification Search
USPC ....................................................... 290/44, 55
See application file for complete search history.

(56) References Cited

U.S. PATENT DOCUMENTS 6,750,559 B2 * 6/2004 Becker ............................ 290/55
7,759,815 B2 * 7/2010 Christensen .................... 290/55
(Continued)

FOREIGN PATENT DOCUMENTS

DE 20 2004 020 317 5/2005
DE 10 2006 013 539 9/2007
(Continued)

OTHER PUBLICATIONS

Sven Nytoft Rasmussen; 1st Technical Examination and Search Report issued in priority Denmark Application No. PA 2009 70176; Jun. 2, 2010; 4 pages; Denmark Patent and Trademark Office.

(Continued)

*Primary Examiner* — Pedro J Cuevas
(74) *Attorney, Agent, or Firm* — Wood, Herron & Evans, LLP

(57) ABSTRACT

A wind power installation includes a machine frame and a rotor shaft which extends between a rotor bearing in a front end of the machine frame and a transmission in a rear end of the machine frame. The rotor shaft is carried by a base of the machine frame to provide increased stiffness and safety in operation. The wind power installation further includes a stiffening element which stiffens the base and extends from the base over the rotor shaft to at least partly cover an upper portion of the rotor shaft.

35 Claims, 5 Drawing Sheets

(56) References Cited

U.S. PATENT DOCUMENTS

| | | | |
|---|---|---|---|
| 7,944,079 B1* | 5/2011 | Signore et al. | 290/55 |
| 7,969,037 B2* | 6/2011 | Segovia et al. | 290/55 |
| 8,108,997 B2* | 2/2012 | Weaver et al. | 29/889.1 |
| 8,227,930 B2* | 7/2012 | Goller et al. | 290/44 |
| 8,500,400 B2* | 8/2013 | Signore et al. | 416/1 |
| 8,591,368 B2* | 11/2013 | Dinter et al. | 475/149 |
| 2003/0071469 A1* | 4/2003 | Becker | 290/55 |
| 2003/0080566 A1* | 5/2003 | Becker et al. | 290/55 |
| 2007/0025840 A1* | 2/2007 | Weaver et al. | 415/122.1 |
| 2009/0261594 A1 | 10/2009 | Christensen | 290/55 |
| 2010/0275442 A1* | 11/2010 | Ohl, Jr. | 29/889.1 |
| 2011/0072627 A1* | 3/2011 | Ohl, Jr. | 29/239 |
| 2011/0101699 A1* | 5/2011 | Segovia et al. | 290/55 |
| 2011/0133473 A1* | 6/2011 | Signore et al. | 290/55 |
| 2012/0230836 A1* | 9/2012 | Porta et al. | 416/244 R |
| 2014/0010664 A1* | 1/2014 | Markussen | 416/244 R |

FOREIGN PATENT DOCUMENTS

| | | |
|---|---|---|
| EP | 1 291 521 | 3/2003 |
| EP | 1 617 075 | 1/2006 |

OTHER PUBLICATIONS

Marco Balice; International Search Report and Written Opinion issued in priority International Application No. PCT/EP2010/066317; May 3, 2011; 12 pages; European Patent Office.

* cited by examiner

WIND POWER INSTALLATION AND METHODS OF USING A MACHINE FRAME IN A WIND POWER INSTALLATION

The invention relates to a wind power installation comprising a machine frame and a rotor shaft which can rotate around a rotation axis and which extends between a rotor bearing in a front end of the machine frame and a transmission in a rear end of the machine frame. The rotor shaft is carried by a base of the machine frame. The invention further relates to methods of using the frame.

BACKGROUND OF THE INVENTION

Wind power installations often comprise a rotor shaft which connects a rotor to a transmission. The rotor and transmission are normally carried by a machine frame which forms part of the nacelle. The machine frame transfers the rotor loads to the wind power installation and thus constitutes a core component in the wind power installation.

In known wind power installations, the rotor shaft is typically suspended in three points or in four points, c.f. "Windkraftanlagen" by Erich Hau, Springer, ISBN 978-3-540-72150-5.

A four point suspended rotor shaft comprises two bearings external to the transmission and typically two suspension points for the transmission itself. The three point suspended rotor shafts are carried by a single bearing external to the transmission and by the transmission itself.

In the four point suspended rotor shafts, the two external bearings are sometimes combined in one large bearing housing. Such a bearing housing may complicate assembly, maintenance, and disassembly processes since it conceals a part of the rotor shaft. The three point suspended rotor shafts are, on the other hand, normally unconcealed since these rotor shafts are normally carried by a machine frame base which is dimensioned so strongly that it sustains not having any stiffening structures extending above the rotor shaft. Such machine frames are typically heavy and expensive to manufacture and handle in the assembly process.

DESCRIPTION OF THE INVENTION

It is an object of the invention to provide a wind power installation with an improved machine frame and various ways of using the machine frame for other purposes than just supporting the rotor shaft and transmission.

According to a first aspect, the invention provides a wind power installation which comprises a machine frame with a stiffening element extending over the rotor shaft between two attachment points where it is attached to the base without hindering rotation of the rotor shaft whereby the stiffening element can stiffen the base during rotation of the rotor shaft.

Since the stiffening element does not hinder rotation, it may remain attached to the wind turbine during operation as well as during maintenance.

During operation, it may serve to strengthen the base and it may serve to shield the rotor shaft and thereby increase safety of operation, e.g. during maintenance of other components than the drive shaft. On maintenance of the drive shaft or replacement of drive train components such as the transmission, the stiffening element may serve as a preliminary support for the drive shaft or other components.

Accordingly, the machine frame may become less heavy compared with traditional machine frames for wind power installations and the manufacturing costs can be reduced due to a simpler or lighter base structure.

Particularly, the stiffening element may be a separate component by which herein is meant that the stiffening element is an individual component which does not form part of the base, the main bearing housing, the rotor shaft, or the transmission. This facilitates an easier assembly process or separation process, e.g. enabling complete exposure of the rotor shaft by detaching of the stiffening element from the base.

To allow operation of the wind turbine and thus rotation of the shaft with the stiffening element attached to the base, contact between the stiffening element and the rotor shaft may be avoided. Accordingly, the stiffening element may be a certain minimum distance from the rotor shaft, e.g. a distance in the range of 1-25, or 1-15 or 1-10 centimeters from an inner surface of the stiffening element to an outer surface of the rotor shaft.

In one embodiment, the distance between the rotor shaft and the stiffening element may be constant, or at least be within a narrow tolerance, e.g. such that the difference in distance from a location with a largest distance to a location with a smallest distance is less than 5 centimeters or even less than 1 centimeters. In this regards, the term "distance" should be understood as the dimension in radial direction from the outer surface of the rotor shaft to the stiffening element.

The wind power installation in question may e.g. be a horizontal axis wind turbine of the generally known kind commercially available in various sizes. The rotor shaft may be of the so called three point suspended kind where the shaft is carried only by a main bearing and by the transmission. This kind of wind power installation is disclosed in further details e.g. in "Windkraftanlagen" by Erich Hau, Springer, ISBN 978-3-540-72150-5.

The stiffening element could be formed as a cover which completely conceals an upper portion of the rotor shaft, or the stiffening element could be formed as a grid of bars or profiles which extends across an upper portion of the rotor shaft and therefore partly covers that upper portion.

The stiffening element may stiffen the machine frame in different directions, in particular such that the rigidity of the machine frame becomes increased.

An increased stiffness is facilitated by a stiffening element which is attached to the base and which has a stiffness which enables force to be transferred between the base and the stiffening element.

As an example, the stiffening element and the base may form a lattice structure.

The stiffening element itself may form an open girder with welded or bolted plate girders or bars forming a latticework.

The stiffening element may e.g. at most encircle 180 degrees around the rotor shaft which enables it to be moved radially away from the rotor shaft.

The stiffening element may, in one embodiment, be detachably connected to the base to allow uncovering of the covered portion of the rotor shaft. The detachable connection could be established as a bolt connection, a rivet connection or a glued but yet detachable connection.

In another embodiment, the stiffening element is hinged to the base. The hinged connection may allow the stiffening element to be turned around a hinge point or around a hinge axis to uncover the rotor shaft. In this case, the stiffening element will stay attached to the machine frame at least at one hinge location whereas the remaining portion of the stiffening element is detached from the machine frame.

The stiffening element may have a height in the vertical direction which is at most 30 percent of the dimension of the rotor shaft in the vertical direction. In this regards, the dimension of the rotor shaft in the vertical direction is considered as the height of a projection of the rotor shaft onto a vertical plane, where the height is measured in a vertical direction.

The base may form a right ledge and a left ledge both extending along opposite sides of the rotor shaft. At opposite ends of the ledges, the ledges may be joined to form a machine frame with a ring shape when seen from above. In this embodiment, the stiffening element may extend between the right and left ledges above the rotor shaft such that the machine frame becomes stiffened by the stiffening element. In this embodiment, in the following referred to as a ledge-embodiment, the stiffening element may stiffen the ledges and prevent the ledges from being deformed, in particular in directions towards each other and away from each other, respectively.

In the ledge-embodiment, the stiffening element may in general reduce displacement of the ledges, also with respect to shear between the ledges.

The stiffening element could be arched, e.g. forming a semi-circular shape extending upwards from one of the ledges and in a curved shape above the rotor shaft to the other ledge. In this case, the arched shape may provide a rise of at most ⅓ of the diameter of the rotor shaft at a location where the rotor shaft is located below the stiffening element. If the rotor shaft has a diameter of say 60 centimeters at a location where it is covered by the stiffening element, the arched shape of the stiffening element may e.g. provide a rise over the ledges of not more than 20 centimeters. If the rotor shape has different diameters, the rise may be ⅓ of the largest diameter of the rotor shaft.

The limited rise and thus the limited height of the stiffening element facilitate improved stiffening of the ledges in a horizontal direction, i.e. in directions of the ledges towards or away from each other.

Irrespective whether the stiffening element is arched, square or any other shape, the stiffening element may comprises an upwards component, i.e. a projection of the stiffening element onto a vertical plane, and a horizontal component, i.e. a projection of the stiffening element onto a horizontal plane. Again, with the purpose of improving stiffness of the horizontal plane, it may be an advantage to limit the upwards component.

In one embodiment, the upwards component has a length being at most 50 percent of the length of the horizontal component, or alternatively at most 40, 30, 20 or even at most 10 percent.

To enable a reduction in the length of the upwards component, the base may comprise elevations or upwards projections at the locations where the stiffening element is fixed to the base. Such elevations may e.g. constitute about 10-50 percent of the total height of the base in a vertical plane.

Since the required horizontal stiffness may vary along the length of the rotor shaft from the front end to the rear end, one may define a ratio between the length of the upwards component and the length of the horizontal component which ratio varies between the rear end and the front end of the machine frame.

In one example, the ratio varies, from say 50 percent in the front end near the main bearing to a ratio of say 10-20 percent in the opposite rear end near the transmission.

To further improve stiffness and thus resistance against movement of the ledges in directions towards and away from each other, the stiffening element may extend in a plane between the right and left ledges so as to transfer forces along straight or nearly straight lines between the right and left ledge.

The stiffening element could be detachably attached to the right ledge at a right rotor side stiffening element mount and at a right transmission side stiffening element mount. In a similar manner, the stiffening element could be detachably attached to the left ledge at a left rotor side stiffening element mount and at a left transmission side stiffening element mount. The mounts may e.g. include threaded holes for receiving bolts for fixing the stiffening element to the base, or it may include similar structures including holes or projections for attaching the stiffening element by use of nails, rivets, clamps etc.

The right and left sided mounts could be located directly opposite each other on the right and left ledges such that lines extending between two mounts are perpendicular to the general direction of the rotor shaft from the front to the rear end of the machine frame.

In one embodiment, the stiffening element forms two cross-bars, one extending from the right rotor side stiffening element mount to the left transmission side stiffening element mount, the other extending from the left rotor side stiffening element mount to the right transmission side stiffening element mount.

The cross-bars could be two separate elements, or they could be formed in one part. As an example of a one part version, the cross-bars could be joined to each other at an intersection located between the mounts, or the cross-bars could comprise joint elements extending elsewhere between the two crossed bars.

In one embodiment, such joint elements extend between the bars at locations close to the mounts where the stiffening element is fixed to the base. In one embodiment, a joint element extends between two cross bars in the vicinity of the right rotor side stiffening element mount and right transmission side stiffening element mount, and another joint element extends between two cross bars in the vicinity of the left rotor side stiffening element mount and left transmission side stiffening element mount.

By vicinity is herein meant that the distance between the mount and the interface between the joint element and cross-bar in question is between 0 and 50 percent of the distance between the right or left rotor side stiffening element mount and right or left transmission side stiffening element mount.

The two cross-bars could be made in one piece, e.g. in a moulding process. In one embodiment, the stiffening element is made from cast iron moulded or casted in a die or mould.

The transmission could be detachably attached to the right ledge at a right transmission mount and detachably attached to the left ledge at a left transmission mount. The attachment of the transmission could be formed in a traditional manner by use of a transmission stay.

The transmission mounts could be located between the transmission side stiffening element mounts and the rotor side stiffening element mounts in a direction from the forward to the rear end of the machine frame. Alternatively, the right transmission side stiffening element mount is merged with the right transmission mount, and the left transmission side stiffening element mount is merged with the left transmission mount. By merged is herein meant that the mounts are located at the same place on the base. As an example, the mount comprises threaded holes for receiving bolts etc, and these threaded holes and bots are provided such that the same bolt or bolts can hold both the transmission and the stiffening element.

To improve the stiffness in the horizontal plane, the stiffening element may comprise at least one transverse bar extending transverse, e.g. perpendicular to the ledges. If the transverse bar is combined with the aforementioned cross-bars, the transverse bar may possess stiffness against elongation being in the range of 50 to 150 percent of that of each of the two cross-bars. By stiffness against elongation is herein meant that force which is required to provide an elongation of the bar.

The transverse bar may extend between the right rotor side stiffening element mount and the left rotor side stiffening element mount.

The stiffening element may form a closed structure so that an upper portion of the rotor shaft is covered completely. To improve safety in the nacelle during operation of the wind turbine, the stiffening element may be made with a closed surface having a surface area being in the range of 100-200 percent of the total surface area of the rotor shaft.

To facilitate transport and maintenance of the wind power installation, the stiffening element may comprise at least two separate elements assembled along an assembly interface. The assembly interface may extend e.g. in a direction between the rear end and the front end or in a direction perpendicular to a direction between the rear end and the front end. In one embodiment, the stiffening element comprises even more than two separate parts. In case of four parts, the assembly interface may extend e.g. in a direction between the rear end and the front end and in a direction perpendicular to that direction.

To enable breaking of the rotor shaft or fixation of the rotor shaft, e.g. in connection with replacement of transmission etc. the machine frame may comprise a fixture e.g. with clamping means adapted for releasable clamping of the rotor shaft, or provided with other means for fixing the rotor shaft to the machine frame.

Particularly, such a fixture may include a clamping structure or a similar structure which can be operated between a fixing state where the rotor shaft is fixed and a released state where the rotor shaft is free to rotate without necessitating removal of the stiffening element from the base.

Particularly, such a fixture may be included in the stiffening element or in the base.

The fixture may e.g. comprise a U-shaped yoke which is movable relative to the stiffening element such that the rotor shaft can be fixed be squeezing of the yoke towards the stiffening element.

The fixing means may include height adjustment means enabling adjustment of the height of the rotor shaft relative to the machine frame. This will enable the rotor shaft to be raised or lowered with regards to a vertical axis.

The machine frame may include power driven means for carrying out the height adjustment e.g. by hydraulic or electric power. The machine frame may further comprise levelling means, e.g. including a laser, a level, e.g. a bubble level etc.

The stiffening element could be movable in a direction being transverse to the rotation axis for uncovering the covered part of the rotor shaft while the rotor shaft is carried by the base. For this purpose, the stiffening element may only partly cover the rotor shaft, e.g. such that it encircles the rotor shaft less than 180 degrees. In this way, assembly and repair work is enabled in a very advantageous manner by the ability of the stiffening element to be moved transverse to the rotation axis for uncovering the rotor shaft. This enables uncovering of the rotor shaft while the rotor shaft is carried by the base and costly work related to removal of the rotor shaft for releasing the stiffening element from the base can be avoided.

In a second aspect, the invention provides a method of changing a transmission of a wind power installation of the already mentioned kind.

According to this method, the stiffening element is used as a support for holding the rotor shaft and/or for moving the rotor shaft relative to the machine frame during change of the transmission.

To enable removal of the transmission with the stiffening element in place, it may be advantageous to have the mounts of the stiffening element onto the base and the mounts of the transmission onto the base at separate locations and such that the transmission can be removed from the base unhindered by the presence of the stiffening element.

The removal of the transmission may include the step of removing the entire machine frame from the nacelle of the wind power installation. In this case, the method may comprise the steps of attaching a hoisting structure to the machine frame at the right and left rotor side stiffening element mounts and optionally at the right and left transmission side stiffening element mounts.

To facilitate a vertically straight upwards lifting in the mounts, the method may further comprise the step of attaching a hoisting spreader to the hoisting structure, the hoisting spreader forming an H-shape with the free ends being arranged vertically above the right and left rotor side stiffening element mounts and the right and left transmission side stiffening element mounts.

DETAILED DESCRIPTION

In the following, embodiments of the invention will be described in further details with reference to the drawing in which.

Figure 1:
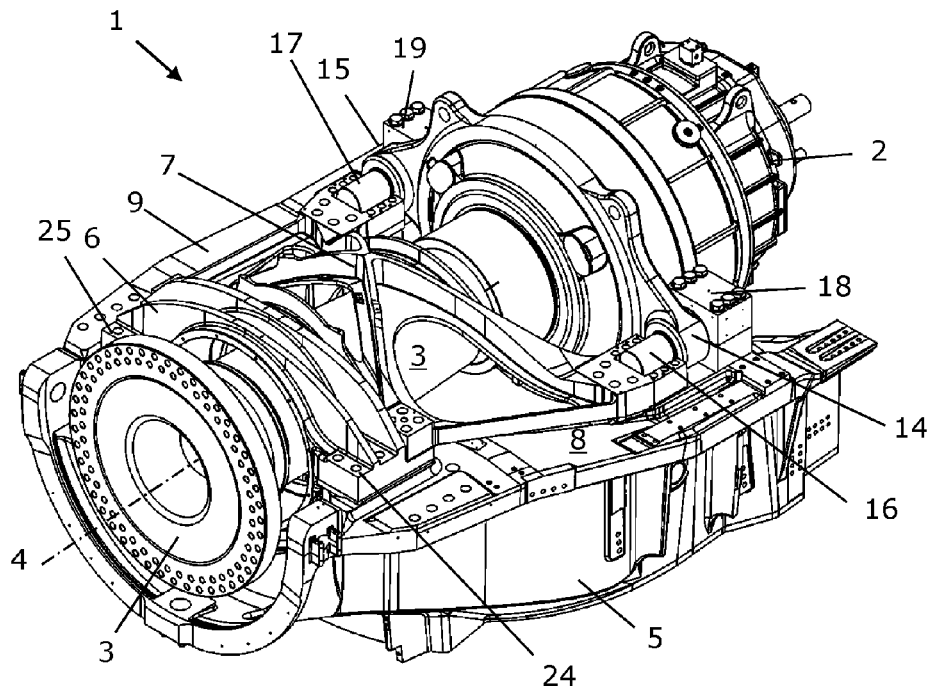
FIGS. 1-3 illustrate a wind power installation according to the invention.
Figure 2:
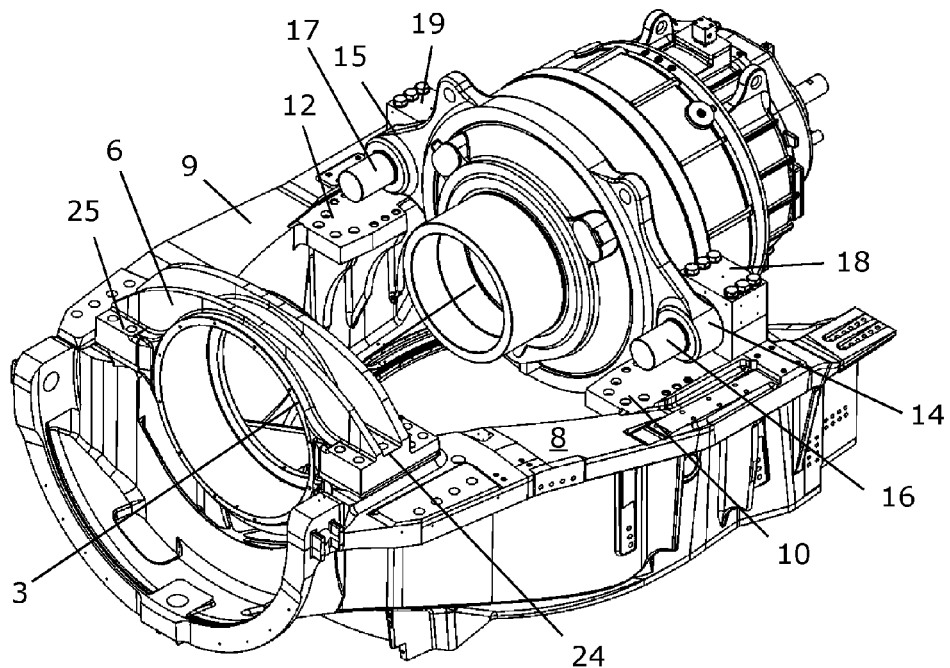
Figure 3:
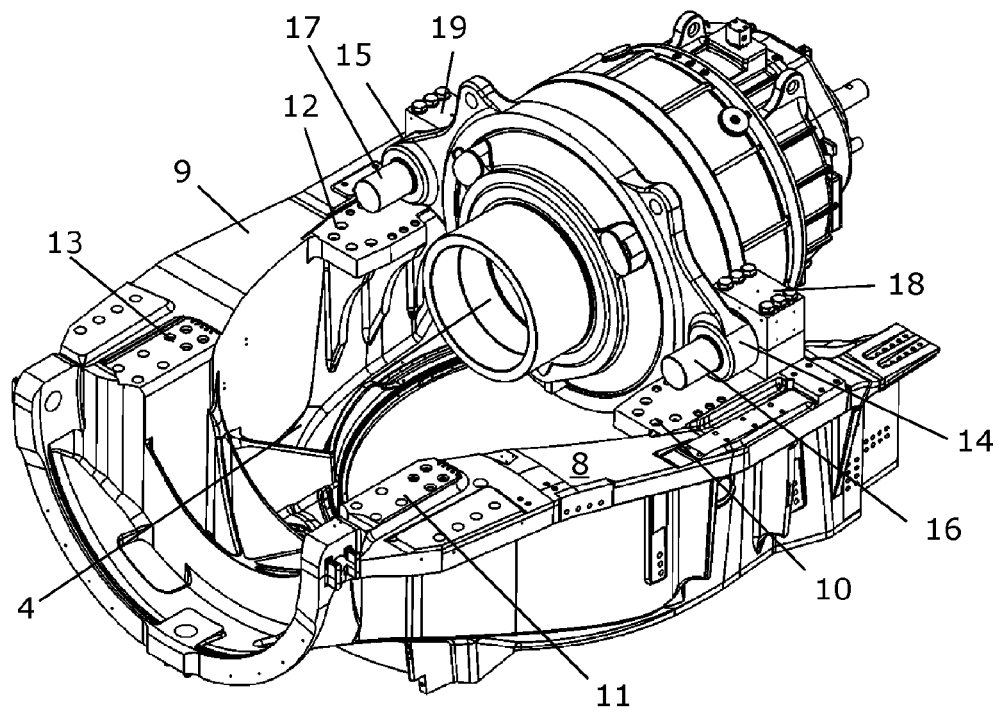
Figure 4:
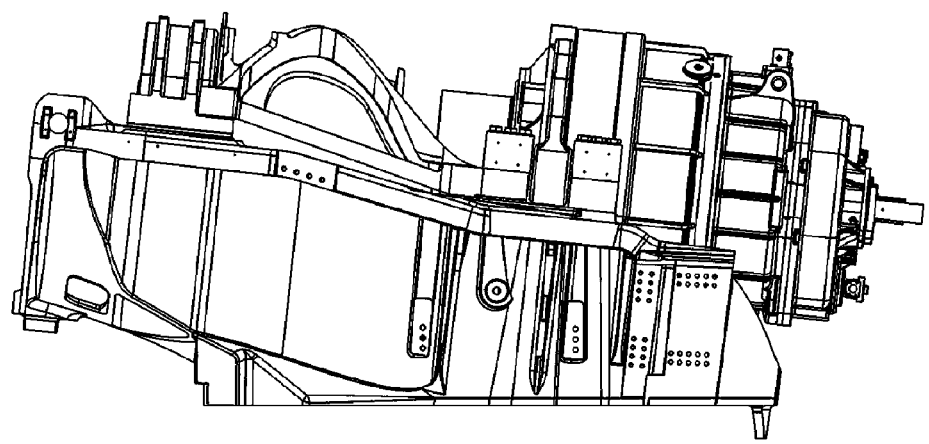
FIG. 4 illustrates a side view of the wind power installation.

As illustrated in FIGS. 1-3 a wind power installation 1 according to the invention comprises a machine frame and a rotor shaft which extends between a rotor bearing in a front end of the machine frame and a transmission 2 in a rear end of the machine frame. The rotor shaft 3 is rotational around rotation axis 4.

The rotor bearing is not illustrated in FIG. 1, but the base 5 forms a seat for the main bearing housing 6. The rotor shaft is carried by the base 5 which is again typically fixed to the yawing system for the wind power installation or which forms part of a wind power installation.

The machine frame further comprises a stiffening element 7 which stiffens the base 5. The stiffening element extends from the base 5 over the rotor shaft to at least partly cover an upper portion of the rotor shaft such that direct access to the rotor shaft is at least partly prevented. This increases safety of operation and enables the use of the stiffening element for fixing the rotor shaft, e.g. during replacement of the transmission 2.

The base forms two ledges 8, 9 on which the stiffening element 7 and the transmission 2 are carried.

The installation in FIG. 1 is illustrated in FIGS. 2 and 3 without the rotor shaft 3 and without the stiffening element 7, in FIG. 3 further without the main bearing housing 6.

The stiffening element is detachably connected to the ledges via four mounts 10, 11, 12, 13 two of which being located on the left sided ledge 8 and two being located on the right sided ledge 9.

Since the transmission side mounts 10, 12 are located under the corresponding mounts on the stiffening element, the transmission side mounts 10, 12 are only visible on the ledges 8, 9 in FIG. 2 and three. Since the rotor side mounts 11, 13 are located under the main bearing housing 6, rotor side mounts 11, 13 are only visible on the ledges 8, 9 in FIG. 3 where the bearing housing is removed.

The right and left ledges are symmetrical about a vertical centre plane through the rotation axis 4.

At least one of the mounts could have been replaced with a hinge element (not shown) such that the stiffening element 7 becomes pivotal about a hinge point or axis.

In the illustrated embodiment, the transmission 2 is fixed in suspensions on each ledge of the base 5. For this purpose, the transmission comprises on each side, a transmission stay 14, 15. Each of the stays comprises a bushing in which a rod is arranged such that the rod coextends the bushing both in a forward and a rearward direction and therefore forms a forward projection 16, 17 and a rearward projection, which is covered by the suspension clamps 18, 19.

As described below, the right transmission side stiffening element mount is merged with the right transmission mount, and the left transmission side stiffening element mount is merged with the left transmission mount.

Each projection is held in place by a corresponding clamp, i.e. in total 4 clamps of which only the rear ones 18, 19 are shown.

Figure 8:
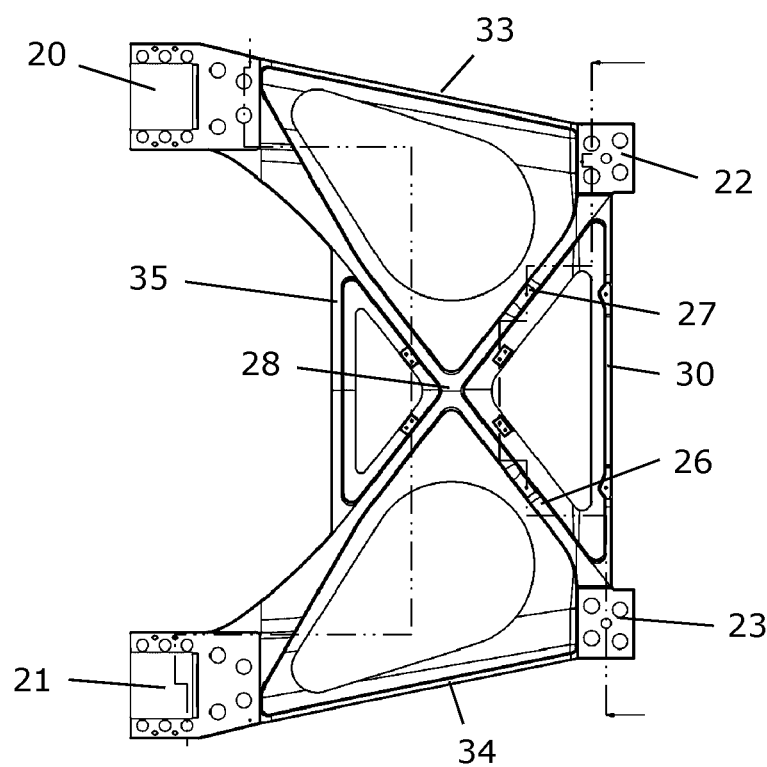

The clamps are bolted onto the corresponding mounts on the ledges of the base. The forward projections 16, 17 rest on transmission saddle mounts 20, 21 (cf. FIGS. 5, 6 and 8) formed in a rear end of the stiffening element 7 and the clamps 15, 17 are clamped on top of the forward projections and therefore hold both the rear end of the stiffening element and the forward projections of the transmission stay in place. In this regards, this is considered as a merge of the transmission mounts and the transmission side mounts of the stiffening element, and in this embodiment, the stiffening element forms part of the suspension for the transmission.

Figure 5:
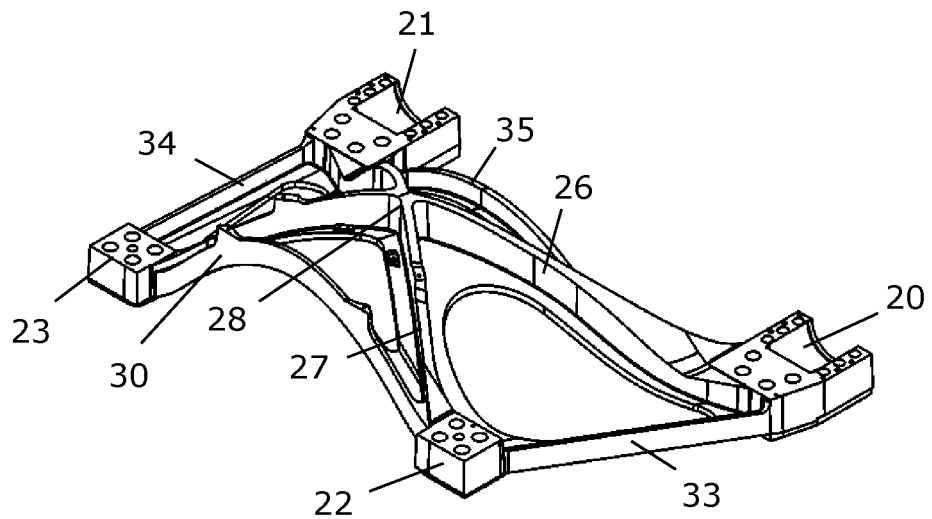
FIGS. 5-8 illustrate a stiffening element for a wind power installation according to the invention.
Figure 6:
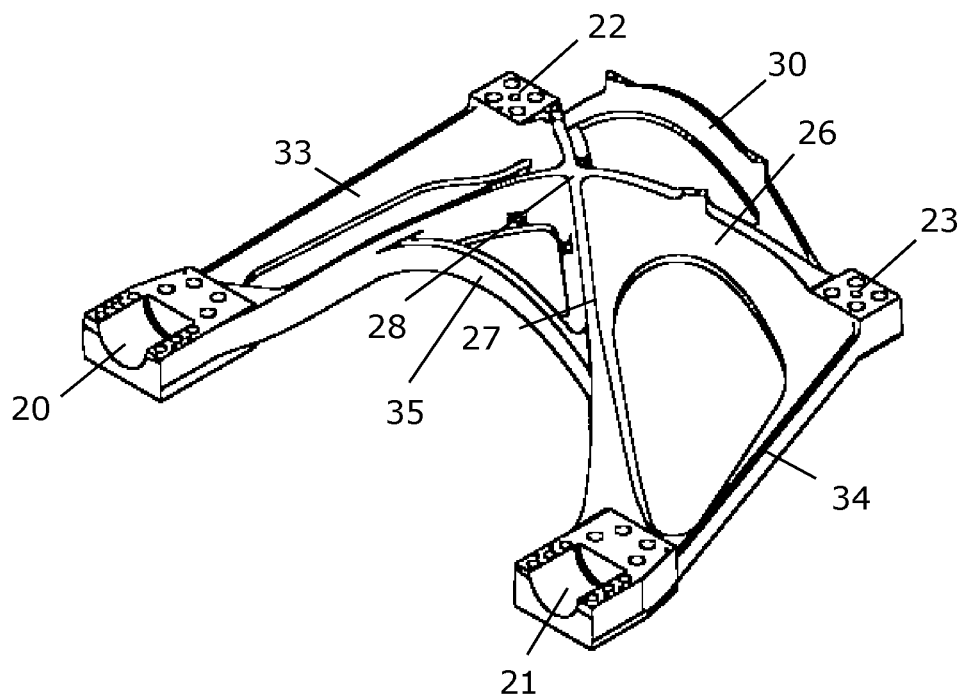

In the forward end of the machine frame, the main bearing housing 6 could be arranged above or below a forward end of the stiffening element so that both the bearing cover 6 and the stiffening element 7 becomes fixed to the base 5 by use of the same set of bolts. In the illustrated embodiments, the forward mounts 22, 23 of the stiffening element (c.f. FIG. 5, 6, 8) are arranged on top of the bearing mounts 24, 25 of the main bearing housing 6 (c.f. FIG. 2). In this regards, this is considered as a merge of the rotor bearing mounts and the rotor side mounts of the stiffening element. The merged mounts of the stiffening element and the main bearing housing is fixed to the rotor side mounts 11, 13 on the ledges 8, 9 (c.f. FIG. 2).

Whereas the stiffening element illustrated in FIGS. 1-4 has a stiffening element formed with cross-bars 26, 27 (cf. FIGS. 5, 6 and 8) which are joined to each other at an intersection 28 located between the mounts 20, 23 and 21, 22, the stiffening element may alternatively be formed as a completely closed cover which conceals the rotor shaft completely.

FIGS. 5-8 illustrate the stiffening element without the base. The transmission saddle mounts 20, 21 formed in a rear end and the attachment points 22, 23 in the front end of the stiffening element 7 are clearly illustrated.

In addition to the cross-bars 26, 27 which are joined to each other at the intersection 28, the illustrated stiffening element 7 comprises a transverse bar 30 extending transverse to the ledges of the base when attached thereto. The transverse bar extends between the attachment points 22, 23 in the front end of the stiffening element 7, and when the stiffening element 7 is fixed to the base, the transverse bar therefore extends between the right rotor side stiffening element mount and the left rotor side stiffening element mount.

The stiffening element, irrespective whether it has an arched shape, a square shape or any other shape comprises an upwards component defining the "height" of a projection of the stiffening element onto a vertical plane. I.e. the upwards component extends from the ledges in a vertical upwards direction. The stiffening element also comprises a horizontal component representing a "width" of a projection of the stiffening element down to a horizontal plane, the width being the dimension of the projection in a direction perpendicular to the rotation axis 4. The horizontal component extends between the ledges.

Figure 7:
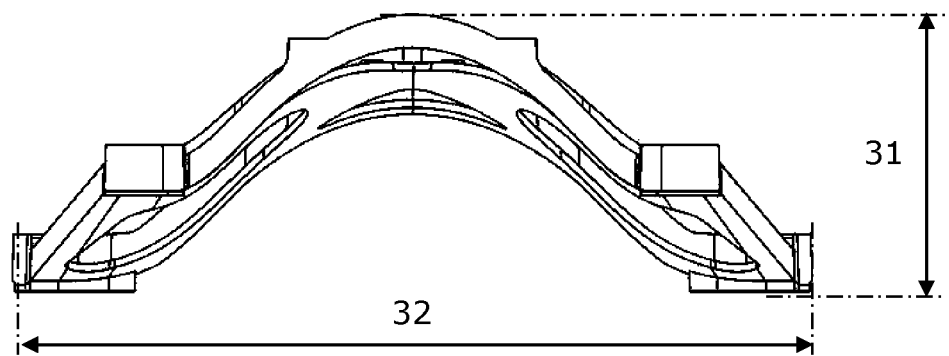

In FIGS. 5-8, the stiffening element has an arched shape, and in FIG. 7, the upwards component is illustrated by the arrow 31 and the horizontal component is illustrated by the arrow 32.

The rise of the arch which corresponds to the upwards component indicated by the arrow 31 is considerably smaller than the horizontal component indicated by the arrow 32.

In FIG. 7, it is clearly indicated that the ratio between the length of the upwards component and the length of the horizontal component varies between the rear end and the front end of the machine frame. In the rear end, horizontal component is larger than the horizontal component in the front end, and oppositely, the upwards component is larger in the front end than in the rear end. Accordingly, the ratio of the upwards divided with the horizontal component is decreased along the length of the stiffening element from the front end to the rear end.

The stiffening element is formed in one part and includes in addition to the cross-bars 26, 27 and transverse bar 30, two joints 33, 34 extending between the cross-bars, or as illustrated herein, between the mounts 20, 22 and 21, 23. where the stiffening element is fixed to the base. In one embodiment, a joint element extends between two cross bars in the vicinity of the right rotor side stiffening element mount and right transmission side stiffening element mount, and another joint element extends between two cross bars in the vicinity of the left rotor side stiffening element mount and left transmission side stiffening element mount.

The illustrated stiffening element further comprises a rear-joint 35 extending between the cross-bars 26, 27 at a location between the intersection 28 and the saddle mounts 20, 21.

Figure 9:
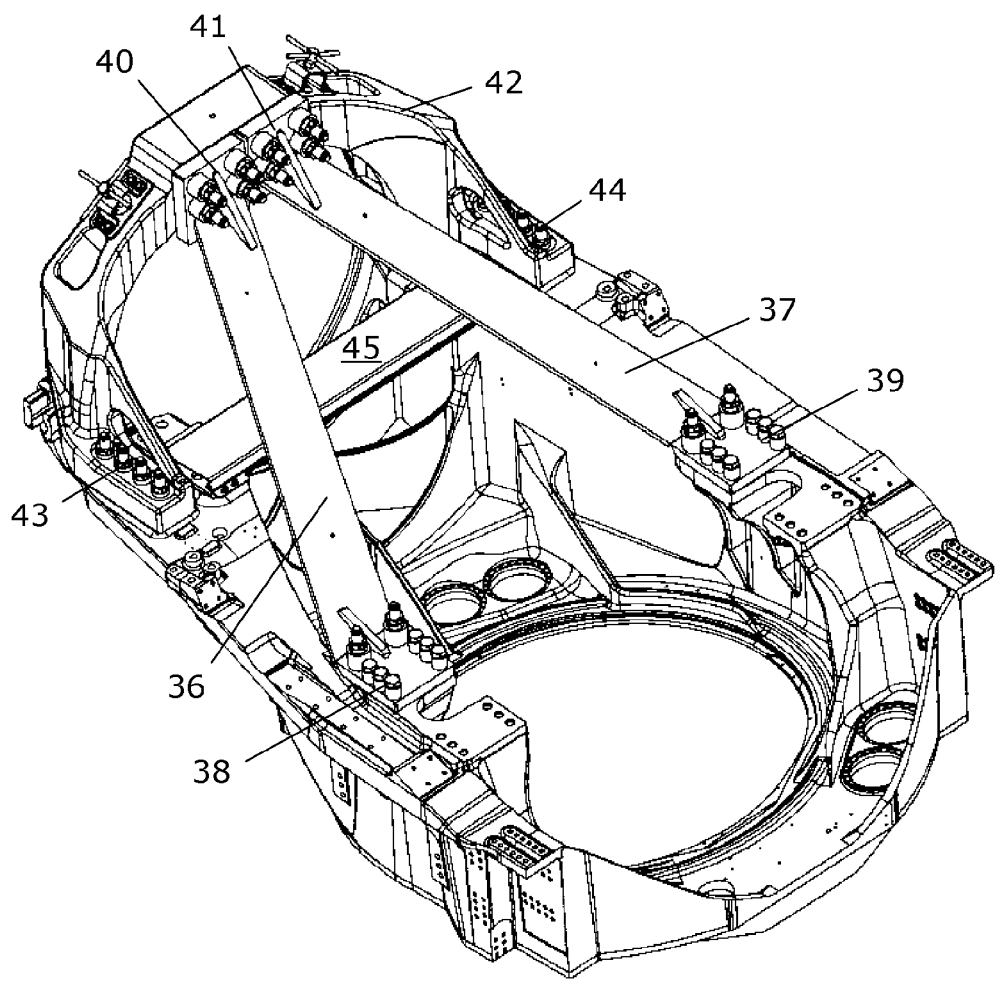
FIG. 9 illustrates an alternatively shaped stiffening element according to the invention.

FIG. 9 illustrates a stiffening element which is made in two separate parts 36, 37. The stiffening elements are attached individually between a mount 38, 39 on the base and a mount 40, 41 on a parking tool 42. The parking tool 42 is attached to the base on the mounts 43, 44.

The parking tool 42 can be used to park the rotor if the rotor shaft is removed for maintenance or repair work on the drive train.

The working platform 45 is attachable to the base and can be used as a platform for the worker during maintenance or repair work on the drive train.

The invention claimed is:

1. A wind power installation comprising a machine frame and a rotor shaft adapted for rotation around a rotation axis and extending between a rotor bearing housing in a front end of the machine frame and a transmission in a rear end of the machine frame, the machine frame comprising a base carrying the rotor shaft, and a stiffening element which increases the rigidity of the machine frame, the stiffening element extending over the rotor shaft between two attachment points where it is attached to the base without contacting the rotor shaft and therefore without hindering rotation of the rotor shaft whereby the stiffening element can stiffen the base during operation of the wind power installation.

2. The wind power installation according to claim 1, wherein the stiffening element at least partly covers a part of the rotor shaft.

3. The wind power installation according to claim 1, wherein the stiffening element is detachably attached to the base.

4. The wind power installation according to claim 1, wherein the stiffening element has a height in vertical direction which is at most 30 percent of the dimension of the rotor shaft in vertical direction.

5. The wind power installation according to claim 1, where the base forms a right ledge and a left ledge both extending along opposite sides of the rotor shaft, and where the stiffening element extends between the right and left ledges above the rotor shaft.

6. The wind power installation according to claim 5, wherein the stiffening element is adapted to transfer force between the right and left ledges.

7. The wind power installation according to claim 5, wherein the stiffening element is arched.

8. The wind power installation according to claim 7, wherein the arched stiffening element forms a rise of at most ⅓ of the diameter of the rotor shaft at a location where the rotor shaft is located below the stiffening element.

9. The wind power installation according to claim 5, wherein the stiffening element comprises an upwards component extending from the ledges in a vertical upwards direction and a horizontal component extending horizontally between the ledges, wherein the upwards component has a length being at most 50 percent of the length of the horizontal component.

10. The wind power installation according to claim 9, wherein a ratio between the length of the upwards component and the length of the horizontal component varies between the rear end and the front end of the machine frame.

11. The wind power installation according to claim 1, wherein the base forms an upper surface with elevations extending in a vertical direction upwards from the upper surface, where the elevations form mounts for fixing of the stiffening element to the base.

12. The wind power installation according to claim 5, wherein the stiffening element extends essentially in a plane between the right and left ledges.

13. The wind power installation according to claim 5, wherein the stiffening element is detachably attached to the right ledge at a right rotor side stiffening element mount and at a right transmission side stiffening element mount, and wherein the stiffening element is detachably attached to the left ledge at a left rotor side stiffening element mount and at a left transmission side stiffening element mount.

14. The wind power installation according to claim 13, wherein right and left sided mounts are located two by two directly opposite each other on the right and left ledges such that lines extending between two mounts become essentially perpendicular a rotational axis of the rotor shaft.

15. The wind power installation according to claim 13, wherein the stiffening element forms two cross-bars, one extending from the right rotor side stiffening element mount to the left transmission side stiffening element mount, the other extending from the left rotor side stiffening element mount to the right transmission side stiffening element mount.

16. The wind power installation according to claim 15, wherein the cross-bars are joined to each other at an intersection located between the mounts.

17. The wind power installation according to claim 15, wherein the two cross-bars are made in one piece.

18. The wind power installation according to claim 5, where the transmission is detachably attached to the right ledge at a right transmission mount and detachably attached to the left ledge at a left transmission mount.

19. The wind power installation according to claim 18, wherein the transmission mounts are located between the transmission side stiffening element mounts and the rotor side stiffening element mounts in a direction from the forward to the rear end of the machine frame.

20. The wind power installation according to claim 11, wherein stiffening element forms part of a suspension for the transmission.

21. The wind power installation according to claim 5, wherein the stiffening element comprises at least one transverse bar extending transverse to the ledges.

22. The wind power installation according to claim 21, wherein the transverse bar extends essentially perpendicular to the ledges.

23. The wind power installation according to claim 12, wherein the transverse bar extends between the right rotor side stiffening element mount and the left rotor side stiffening element mount.

24. The wind power installation according to claim 1, wherein the stiffening element covers an upper portion of the rotor shaft.

25. The wind power installation according to claim 1, wherein the stiffening element comprises at least two separate elements assembled along an assembly interface which extends in a direction between the rear end and the front end.

26. The wind power installation according to claim 1, wherein the stiffening element comprises at least two separate elements assembled along an assembly interface which extends in a direction perpendicular to a direction between the rear end and the front end.

27. The wind power installation according to claim 1, further comprising a fixture being movable between a fixing state where the rotor shaft is fixed and a released state where the rotor shaft is free to rotate.

28. The wind power installation according to claim 27, wherein the fixture is movable between the fixing state and the released state without removal of the stiffening element from the base.

29. The wind power installation according to claim 27, wherein the fixture is included in the stiffening element or in the base.

30. The wind power installation according to claim 27, wherein the fixture comprises height adjustment means enabling adjustment of the height of the rotor shaft relative to the machine frame.

31. The wind power installation according to claim 27, where the fixture and stiffening element are arranged on opposite sides of the rotor shaft such that the rotor shaft can be fixed be squeezing of the fixture element towards the stiffening element.

32. The wind power installation according to claim 1, wherein the stiffening element is movable in a direction being transverse to the rotation axis for uncovering the covered part of the rotor shaft while the rotor shaft is carried by the base.

33. A method of changing a transmission of a wind power installation, the wind power installation comprising a machine frame and a rotor shaft adapted for rotation around a rotation axis and extending between a rotor bearing housing in a front end of the machine frame and the transmission in a rear end of the machine frame, the machine frame comprising a base carrying the rotor shaft, and a stiffening element which increases the rigidity of the machine frame, the stiffening element extending over the rotor shaft between two attachment points where it is attached to the base without contacting the rotor shaft and therefore without hindering rotation of the rotor shaft whereby the stiffening element can stiffen the base during operation of the wind power installation, the method comprising:
- using the stiffening element to support the rotor shaft;
- decoupling the rotor shaft from the transmission; and
- removing the transmission from the wind power installation while the stiffening element is supporting the rotor shaft.

34. The method according to claim 33, further comprising attaching a hoisting structure to the machine frame at the right and left rotor side stiffening element mounts and at the right and left transmission side stiffening element mounts.

35. The method according to claim 34, further comprising attaching a hoisting spreader to the hoisting structure, the hoisting spreader forming an H-shape with the free ends being arranged vertically above the right and left rotor side stiffening element mounts and the right and left transmission side stiffening element mounts.

* * * * *